(12) United States Patent
Andreani et al.

(10) Patent No.: US 11,801,930 B2
(45) Date of Patent: Oct. 31, 2023

(54) WING FOR AIRCRAFT

(71) Applicant: Airbus Operations GmbH, Hamburg (DE)

(72) Inventors: Luc Andreani, Hamburg (DE); Tobias Schreck, Hamburg (DE); Igor Stab, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 214 days.

(21) Appl. No.: 17/208,619

(22) Filed: Mar. 22, 2021

(65) Prior Publication Data
US 2021/0300522 A1 Sep. 30, 2021

(30) Foreign Application Priority Data
Mar. 24, 2020 (DE) .......................... 102020108012.3

(51) Int. Cl.
*B64C 3/58* (2006.01)
*B64C 13/30* (2006.01)
*B64C 9/22* (2006.01)

(52) U.S. Cl.
CPC .................. *B64C 3/58* (2013.01); *B64C 9/22* (2013.01); *B64C 13/30* (2013.01)

(58) Field of Classification Search
None
See application file for complete search history.

(56) References Cited

U.S. PATENT DOCUMENTS

| 2,885,161 | A | | 5/1959 | Kerker et al. |
| 4,032,087 | A | * | 6/1977 | Cleaves .................... B64C 3/58 244/113 |
| 8,657,238 | B2 | | 2/2014 | Fox et al. |
| 10,618,625 | B2 | | 4/2020 | Leopold |
| 2010/0324754 | A1 | * | 12/2010 | Barrows ................ B64D 19/02 701/3 |

FOREIGN PATENT DOCUMENTS

| EP | 2543588 A1 | 1/2013 |
| EP | 3428059 A1 | 1/2019 |

OTHER PUBLICATIONS

German Search Report; priority document.

* cited by examiner

*Primary Examiner* — Justin M Benedik
(74) *Attorney, Agent, or Firm* — Greer, Burns & Crain, Ltd.

(57) ABSTRACT

A wing for an aircraft including a fixed wing and a high-lift device movable between a retracted position and an extended position. The high-lift device includes a movable fence. The fence is movable between a first position in which the fence does not protrude beyond an outer surface of the high-lift device and a second position in which the fence protrudes beyond the outer surface of the high-lift device. The fence is in the first position when the high-lift device is in the retracted position and in the second position when the high-lift device is in the extended position. Further, an aircraft with such a wing, a high-lift device and a fence as well as use of a high-lift device and a fence are provided.

19 Claims, 6 Drawing Sheets

WING FOR AIRCRAFT

CROSS-REFERENCES TO RELATED APPLICATIONS

This application claims the benefit of the German patent application No. 102020108012.3 filed on Mar. 24, 2020, the entire disclosures of which are incorporated herein by way of reference.

FIELD OF THE INVENTION

The present invention is directed to a wing for an aircraft comprising a fixed wing and a high-lift device attached to a leading edge of the fixed wing. The high-lift device extends in a spanwise direction of the wing between an inward end of the high-lift device and an outward end of the high-lift device. The high-lift device is configured to be moved between a retracted position and an extended position. The invention further relates to an aircraft comprising a wing, a high-lift device, use of a high-lift device, a fence for a high-lift device and use of a fence.

BACKGROUND OF THE INVENTION

Leading-edge high-lift devices are well known means to increase the camber and, therefore, the lift of an aircraft during take-off and landing, i.e., when speed or velocity of the aircraft is relatively low. One commonly used high-lift device is a slat which is attached to a leading edge of a fixed wing and deployed on a trajectory comprising a translational and a rotational motion to one or more extended positions. When the slat is extended, a gap is formed between the wing and the slat. Another type of leading edge high-lift device is a droop or droop nose. A droop nose can also be extended from a retracted position to one or more extended positions in order to increase the lift of the wing. Contrary to a slat, no gap is formed between a fixed wing to which the droop nose is mounted and the droop nose when the droop nose has been moved to the extended position.

SUMMARY OF THE INVENTION

It is an object of the present invention to provide a wing and an aircraft with a wing with improved aerodynamics or aerodynamic performance at low speed during landing and takeoff.

In a first aspect, the problem underlying the present invention is solved by a wing for an aircraft comprising a fixed wing and a high-lift device attached to a leading edge of the fixed wing. The high-lift device extends in a spanwise direction of the wing between an inward end of the high-lift device and an outward end of the high-lift device. The high-lift device is configured to be moved between a retracted position and an extended position. The high-lift device comprises a movable fence arranged at the inward end or the outward end of the high-lift device. The fence is configured such that the fence is movable between a first position and a second position, wherein in the first position, the fence does not protrude beyond an outer surface of the high-lift device and in the second position, the fence protrudes beyond the outer surface of the high-lift device or wherein in the first position, the fence protrudes less beyond the outer surface of the high-lift device than in the second position. The fence is configured such that it is in the first position when the high-lift device is in the retracted position. The fence is in the second position when the high-lift device is in the extended position.

In other words, the wing according to the present invention comprises a fixed wing to which at least one leading edge high-lift device has been attached. The high-lift device is preferably a slat or a droop nose which may also be referred to as a droop. Both a slat and a droop nose are high-lift devices that can be extended from a retracted position to an extended position. In the retracted position an outer surface of the slat and the droop nose extends flush with an outer surface of the fixed wing. The high-lift devices are, in particular, part of the leading edge of the wing in their retracted position. When moved to the extended or deployed position, the slat and droop nose increase the camber of the wing in order to increase the lift of the wing at low speeds, for example, during take-off and landing. Both types of leading edge high-lift device may move along a trajectory between the retracted position and the extended position that includes a combined rotational movement and translational movement.

The major difference between a slat and a droop nose is that in the extended position, a gap is formed between the trailing edge of the slat and the fixed wing, whereas no gap is formed between the fixed wing and the droop nose. The latter are usually used as the most inward leading edge high-lift device, i.e., those leading edge high-lift devices that are arranged most closely to a root of the wing or a fuselage of an aircraft to which the wing is to be attached, i.e., the onglet.

The high-lift device has an inward end and an outward end between which it extends. The extension direction generally corresponds to the span or spanwise direction of the wing. The inward end of the high-lift device is defined as that end of the high-lift device in the spanwise direction of the wing which is closer to the root of the wing, i.e., that end of the wing which is intended to be connected to a fuselage of an aircraft. Vice versa, the outward end of the high-lift device is that end of the high-lift device which is closer to the tip of the wing.

Means for moving leading edge high-lift devices, such as a slat between a retracted position and extended position, are well-known in the art and may involve the use of slat tracks.

The high-lift device comprises a movable fence which is attached to one of the inward end and the outward end of the high-lift device. The fence or boundary layer fence may, for example, be a sheet of metal or can be made from a composite material.

It can be moved between two positions: a first position and a second position. In the first position, the fence is preferably arranged inside the outside contour or outer surface of the high-lift device, or its outer contour at least conforms with the outer contour of the high-lift device so that it does not protrude anywhere beyond an outer surface of the high-lift device and the remainder of the fixed wing and does not affect the flow over the wing. Such a position may also be referred to as a concealed position. In the second position, the high-lift device is moved to a position in which protrudes beyond the outer surface of the high-lift device. Hence, it is not hidden inside the wing, but affects the flow of air over the wing. This position may also be referred to as an effective position.

In an alternative embodiment, the fence protrudes beyond the outer surface of the high-lift device in both the first position and the second position. However, in the first position it protrudes less beyond the outer surface than in the second position. The amount by which the fence protrudes beyond the outer surface of the high-lift device may, for example, be defined as the maximum distance normal to the outer surface of the fixed wing which the fence protrudes beyond the outer surface of the fixed wing, or it may be defined as the area of the fence parallel to the direction of motion of the fence between the first position and the second position protruding beyond the outer surface of the fixed wing.

In a preferred embodiment, the fence protrudes beyond the leading edge of the high-lift device in the second position. Additionally or alternatively, the fence protrudes beyond an upper surface of the high-lift device in the second position which is part of a suction surface of the wing.

The fence is configured such that its movement between the first position and the second position is coupled to the movement of the high-lift device between the retracted position and the extended position. When the high-lift device is in the retracted position, the fence is in the first position. When the high-lift device is in the extended position, the fence is in the second position.

Hence, the fence advantageously allows influencing the flow separation on the wing at low speeds during take-off and landing when the high-lift device is extended. At the same time, since the fence is hidden inside or at least further retracted into the wing during high and medium air speeds when the high-lift device is in the retracted position, the aerodynamic properties of the wing during medium and high air speeds are not negatively affected.

It should be noted that as a high-lift device may have multiple deployed positions, the fence also may have multiple second positions. In each second position, the amount by which the fence protrudes beyond the outer surface of the high-lift device may be different. Also, the relationship between the amount by which the fence protrudes beyond the outer surface of the high-lift device does not have to be linear but may be defined by a non-linear relationship. In a preferred embodiment it may reach a maximum before the high-lift device is fully extended and decrease if the high-lift device is further extended. For example, the fence may advantageously be configured such that the fence protrudes beyond the outer surface of the high-lift device by a first amount when the high-lift device is in a first extended position to which the high-lift device is extended during take-off of the aircraft and the fence protrudes beyond the outer surface of the high-lift device by a second amount when the high-lift device is in a second extended position to which the high-lift device is extended during landing of the aircraft, wherein the second amount is smaller than the first amount. The high-lift device is extended further during landing than during take-off. Hence, in the preferred exemplary embodiment, the flow barrier provided by the fence is advantageously larger during take-off than during landing.

In a preferred embodiment, the fence comprises an actuating mechanism for moving the fence from the first position to the second position when the high-lift device is moved from the retracted position to the extended position, and for moving the fence from the second position to the first position when the high-lift device is moved from the extended position to the retracted position. The actuating mechanism may, for example, be a hydraulic or electric mechanism. Electric and hydraulic links have to be controlled such that the movement of the fence from the first position to the second position and back is aligned with the movement of the high-lift device.

However, preferably the actuating mechanism is a mechanical link connecting the fence to the fixed wing. Using a purely mechanical link has the advantage that the fence is automatically moved to the second position when the high-lift device is moved to the deployed position and that the fence is automatically moved to the first position when the high-lift device is moved to the retracted position. It is, therefore, not necessary to provide additional control means that coordinate the operation of the fence and the high-lift device.

Preferably, the mechanical link extends from an inner hinge attached to the fixed wing to an outer hinge attached to the fence and comprises at least a center rod. Using a mechanical link with at least one rod makes use of the relative movement between the high-lift device and the fixed wing to move the fence between the first position and the second position.

It is further preferred that the mechanical link extends via a first movable bearing, a center hinge located at the high-lift device and a second movable bearing and additionally comprises an inner rod and an outer rod, wherein the inner rod extends between the inner hinge and the first movable bearing, the center rod extends between the first and the second movable bearing and is rotatably attached at the center hinge to the high-lift device and the outer rod extends between the second movable bearing and the outer hinge.

In the preferred embodiment, an incompressible yet flexible connection is provided via the mechanical link that comprises three rods which are rotatably connected via movable bearings. The bearings are movable in that they are not attached to any of the fixed wing, the high-lift device and the fence, but only to the rods. The first movable bearing connects an inner rod rotatably to the center rod and the second movable bearing connects the center rod to an outer rod. The inner rod and the outer rod are connected to the inner and outer hinge, respectively. The center rod is further rotatably attached via a center hinge to the high-lift device.

When the high-lift device is moved from the retracted position to the extended position the center hinge moves with the high-lift device. As the distance between an inner end of the center rod attached via the first movable bearing to the inner hinges is fixed due to the fixed length of the inner rod, the movement of the high-lift device induces a rotation of the center rod. In turn, the outer rod connected to an outer end of the center rod via the second movable bearing pushes the fence to the second position. Likewise, when the high-lift device is moved to the retracted position, an induced rotation of the rod in the opposing direction automatically pulls the fence back into the first position.

Alternatively, the center rod directly connects inner hinge to the outer hinge. In other words, the center rod is the only element of the mechanical link extending between the inner hinge and the outer hinge. In this embodiment a particularly simple and robust actuating mechanism is provided which allows moving the fence between the first position and one or more second positions, in particular, when the high-lift device is moved in a combined translational and rotational movement from the retracted to the one or more extended positions. Further, the preferred embodiment can also be used to provide a fence movable to multiple second positions, where the amount by which the fence protrudes beyond the outer surface of the high-lift device is different in each of the second positions.

In a preferred embodiment, the fence comprises a first blade. The first blade may, for example, be formed from a metal sheet or from a fiber-reinforced plastic material. The first blade is preferably rotatably mounted to the high-lift device at a first mounting point wherein the first blade is configured to rotate about the first mounting point for moving the fence between the first position and the second position.

It is further preferred that the outer hinge is attached to the first blade at a position which is spaced apart from the first mounting point such that a movement of the high-lift device between the retracted position and the extended position results in a rotation of the center rod about the center hinge which is translated via the outer rod into a rotation of the first blade. Hence, the first blade is preferably moved between the second position and the first position solely by a rotational movement induced by the mechanical link discussed above.

Alternatively, the first blade may be configured to perform a translatory motion for moving the fence between the first position and the second position. The translatory motion may also be induced by the mechanical link described in the preceding embodiments.

In another preferred embodiment, the fence additionally comprises a second blade. Using an additional blade allows to create a fence covering a large area, in particular, when the blades of the fence are rotated for moving the fence between the first position and the second position. Preferably, the second blade is rotatably mounted to the high-lift device at a second mounting point, wherein the first blade is configured to rotate about the second mounting point for moving the fence between the first position and the second position.

It is further preferred that the outer hinge is attached to the second blade at a position which is spaced apart from the second mounting point such that a movement of the high-lift device between the retracted position and the extended position results in a rotation of the center rod about the center hinge which is translated via the outer rod into a rotation of the second blade. Hence, the previously discussed mechanical link can advantageously be used to rotate one of the first blade and the second blade or preferably both blades to move the fence between the first position and the second position. Hence, in the preferred embodiment, a single mechanical link is used to operate both blades synchronously.

In a preferred embodiment, the wing comprises a plurality of additional high-lift devices attached to the leading edge of the wing. The high-lift device comprising the fence is arranged inward of the plurality of the additional high-lift devices on the fixed wing in the spanwise direction and wherein the fence is attached at the inward end of the high-lift device. Hence, in the preferred embodiment the fence creates a barrier for the airflow between the most inward high-lift device and the inward area of the fixed wing at low airspeeds which improves the overall aerodynamic performance of the wing.

In a second aspect, the problem underlying the present invention is solved by an aircraft comprising a wing according to any of the embodiments described in the preceding paragraphs. The advantages of the aircraft correspond to the advantages of the wing used as part of the aircraft.

In a third aspect, the problem underlying the present invention is solved by a high-lift device for a wing for an aircraft, the wing comprising a fixed wing. The high-lift device is configured for attachment to a leading edge of the fixed wing such that it extends in a spanwise direction of the wing between an inward end of the high-lift device and an outward end of the high-lift device and can be moved between a retracted position and an extended position. The high-lift device comprises a movable fence arranged at the inward end or the outward end of the high-lift device. The fence is configured such that the fence is movable between a first position and a second position, wherein in the first position, the fence does not protrude beyond an outer surface of the high-lift device and in the second position the fence protrudes beyond the outer surface of the high-lift device, or wherein in the first position, the fence protrudes less beyond the outer surface of the high-lift device than in the second position. The fence is configured such that it is in the first position when the high-lift device is in the retracted position. The fence is in the second position when the high-lift device is in the extended position.

In preferred embodiments, the high-lift device can be configured in the same way as the high-lift device described above as part of the different embodiments of a wing. In order to avoid unnecessary repetitions, descriptions of these embodiments are not repeated here. The advantages of the embodiments of the high-lift device correspond to the advantages of the respective embodiment of a wing comprising the high-lift device described above.

In a fourth aspect, the problem underlying the present invention is solved by the use of a high-lift device as set out in the preceding paragraphs on a wing for an aircraft, the wing comprising a fixed wing. The advantages of the use of such a high-lift device correspond to the advantages of the high-lift device discussed above.

In a fifth aspect, the problem underlying the present invention is solved by a fence for a high-lift device. The high-lift device is part of a wing for an aircraft, the wing further comprising a fixed wing. The high-lift device is attached to a leading edge of the fixed wing such that it extends in a spanwise direction of the wing between an inward end and an outward end and can be moved between a retracted position and an extended position. The fence is adapted to be movably attached to the high-lift device at the inward end or the outward end of the high-lift device. The fence is configured such that the fence is movable between a first position and a second position, wherein in the first position, the fence does not protrude beyond an outer surface of the high-lift device and in the second position, the fence protrudes beyond the outer surface of the high-lift device, or wherein in the first position, the fence protrudes less beyond the outer surface of the high-lift device than in the second position. The fence is configured such that it is in the first position when the high-lift device is in the retracted position. The fence is in the second position when the high-lift device is in the extended position.

In preferred embodiments the fence can be configured in the same way as the fence described above as part of the different embodiments of a wing. In order to avoid unnecessary repetitions, these embodiments are not repeated here. The advantages of the embodiments of the fence correspond to the advantages of the respective embodiment of a wing comprising the fence described above.

Finally, in a fifth aspect, the problem underlying the present invention is solved by a use of a fence on a wing for an aircraft, the wing comprising a fixed wing and a high-lift device.

BRIEF DESCRIPTION OF THE DRAWINGS

In the following exemplary embodiments of aircraft comprising exemplary embodiments of wings on which exemplary embodiments of high-lift devices and fences are used will be described with reference to the drawings. In the drawings

DETAILED DESCRIPTION OF THE PREFERRED EMBODIMENTS

Figure 1:
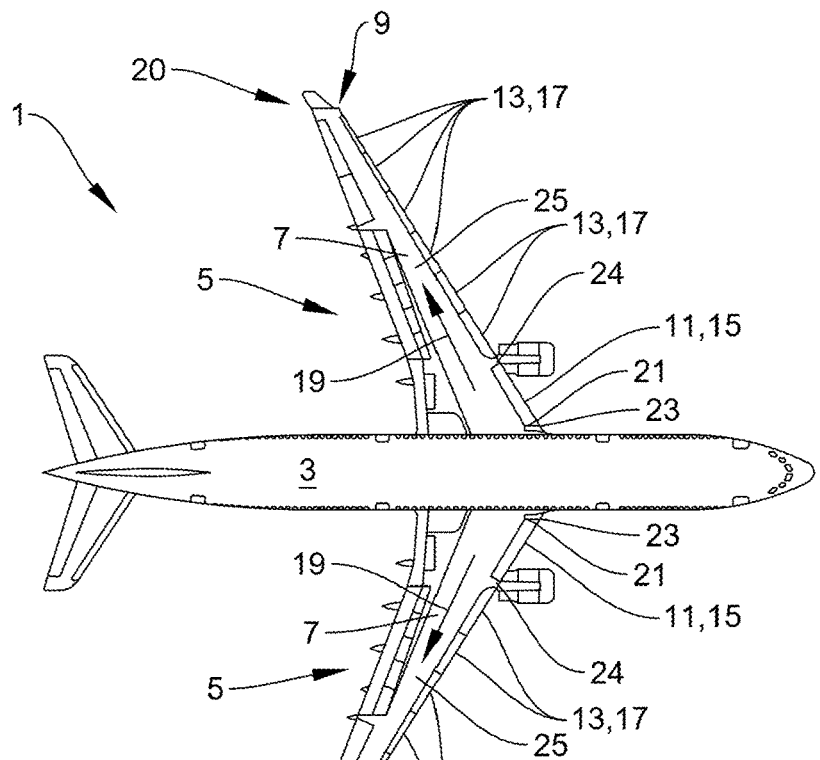
FIG. 1 shows a top view of an exemplary embodiment of an aircraft.

In the following description of exemplary embodiments of aircraft, wings for aircraft, high-lift devices and movable fences for high-lift devices like elements will be designated with like reference numerals throughout all drawings. The description will commence with FIGS. 1 and 2 showing exemplary embodiments of aircraft, continue with FIGS. 3A to 3C which show the general principle of the movable fence and finally discuss FIGS. 4A to 4D, 5A, 5B, 6A, 6B and 7A to 7D which each show details of exemplary embodiments that can be used on the exemplary embodiments of aircraft of FIGS. 1 and 2 and the wings of FIGS. 3A to 3C.

FIG. 1 shows a first embodiment of an aircraft 1 comprising a fuselage 3 to which two symmetrical wings 5 are attached. Each wing 5 comprises a fixed wing 7 with a leading edge 9 to which a plurality of high-lift devices 11, 13 have been attached. These high-lift devices 11, 13 may also be referred to as leading edge high-lift devices 11, 13. In the embodiment of FIG. 1, the high-lift devices 11, 13 are slats 15, 17. On both wings 5 the most inward high-lift device 11 in a respective spanwise direction 19 extending from the fuselage 3 to a respective wing tip 20 is fitted on its inward end 21 with a fence or slat fence 23. No fence is fitted to the outward end 24 of the high-lift device 11. The fence 23 is configured such that when the high-lift devices are moved from a retracted position as shown in FIG. 1 to a deployed position (not shown), the fences 23 move from a first position shown in FIG. 1 where the fences 23 do not extend beyond respective outer surfaces 25 of the wings 5 to second positions (not shown) in which they extend beyond the outer surfaces 25 and affect the boundary layer flow about the wing 5.

Figure 2:
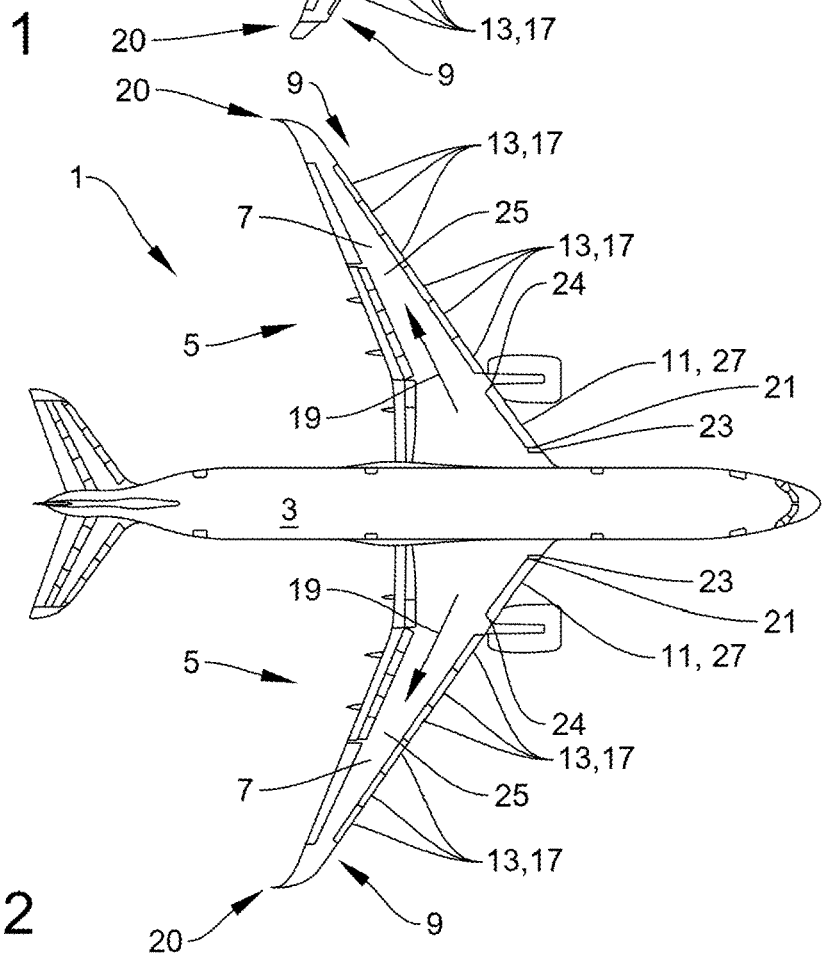
FIG. 2 shows a top view of another exemplary embodiment of an aircraft.

FIG. 2 shows a second embodiment of an aircraft 1 which is in many aspects similar to the aircraft 1 shown in FIG. 1. Only the differences to the aircraft 1 shown in FIG. 1 will be described here. For all other features, reference is made to the description of FIG. 1. In FIG. 2, the most inward high-lift device 11 on both wings 5 is not a slat but a droop nose 27 or droop 27. The most inward or simply inward high-lift device is the high-lift device 11 closest to the fuselage 3. The fence 23 is thus attached to the respective inward end 21 of the droop noses 27 in the spanwise direction 19.

Figures 3A, 3B:
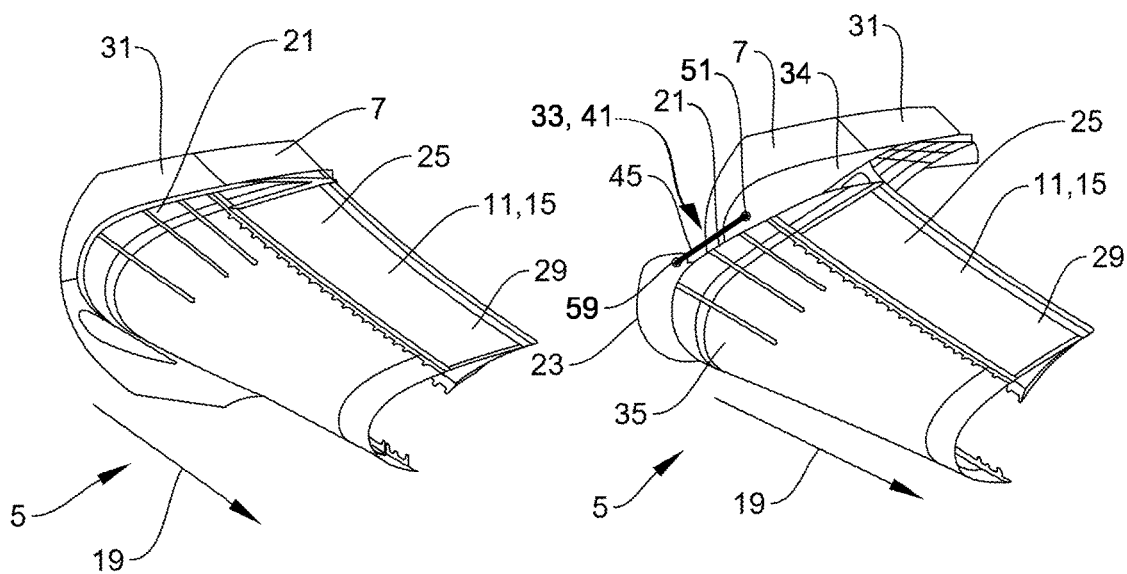
FIG. 3A shows a perspective view of an exemplary embodiment of a wing with an exemplary embodiment of a high-lift device in a retracted position.
FIG. 3B shows a perspective view of the exemplary embodiment of a wing of FIG. 3A with the exemplary embodiment of the high-lift device in a first extended position.
Figures 3C, 4A:
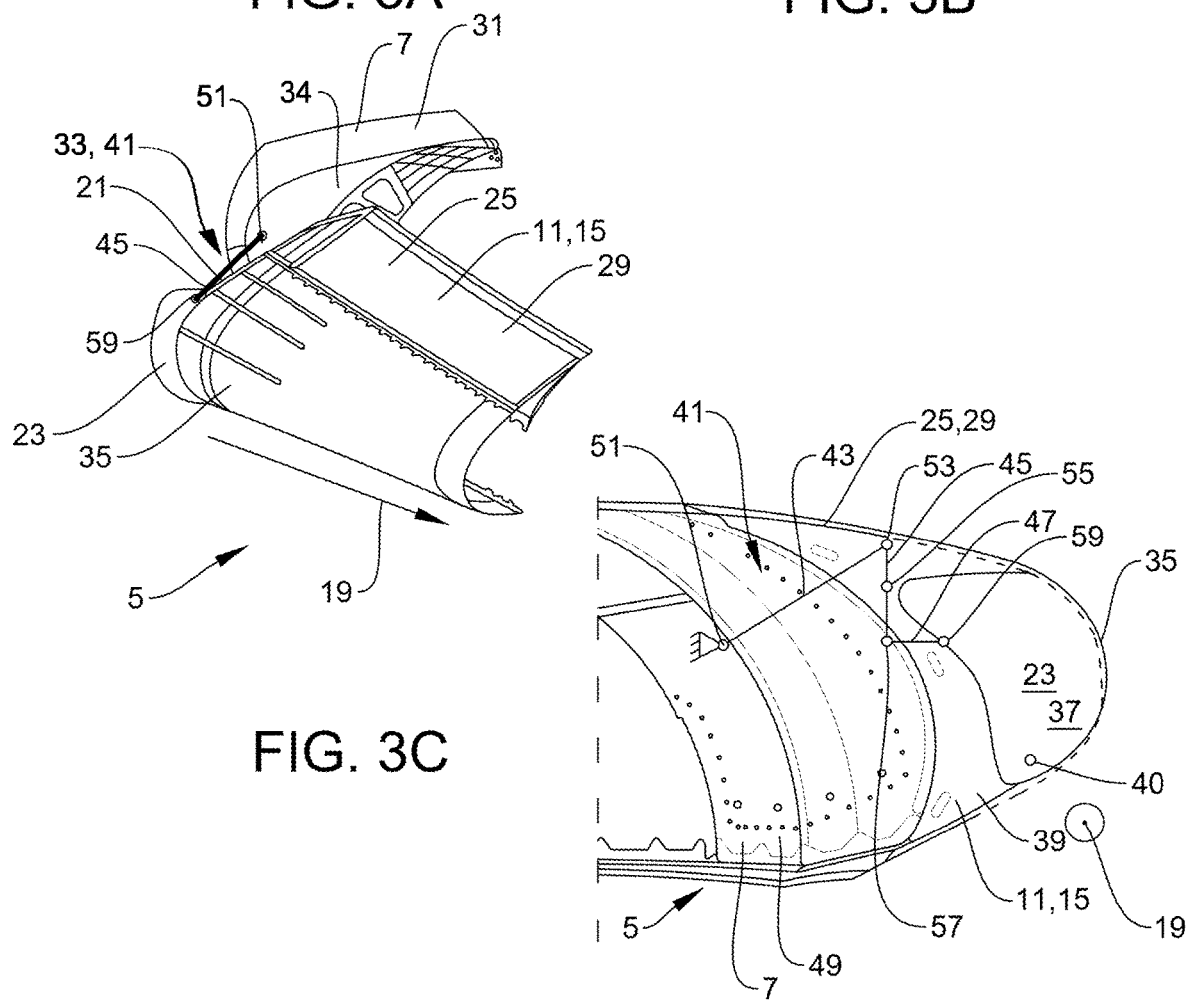
FIG. 3C shows a perspective view of the exemplary embodiment of a wing of FIG. 3A with the exemplary embodiment of the high-lift device in a second extended position.
FIG. 4A shows a sectional view of a further exemplary embodiment of a wing with an exemplary embodiment of a high-lift device in a retracted position and an exemplary embodiment of a fence in a first position.

FIGS. 3A to 3C show an exemplary embodiment of a wing 5 comprising a fixed wing 7 and an exemplary embodiment of a leading edge high-lift device 11 in form of a slat 15. The wing 5 may, for example, be one of the wings 5 shown in FIGS. 1 and 2. Only part of the fixed wing 7 and the high-lift device 11 are shown in FIGS. 3A to 3C. As indicated by the shape of the fixed wing 7, the high-lift device 11 is the most inward high-lift device 11 in a spanwise direction 19 of the wing 5. FIGS. 3A to 3C show the same wing 5 with the high-lift device 11 in different positions.

The wing 5 further comprises a fence 23 attached to an inward end 21 of the high-lift device 11 which can also be referred to as a slat fence 23 as the high-lift device 11 is a slat 15. The fence 23 is only visible in FIGS. 3B and 3C for reasons set out below.

In FIG. 3A the high-lift device 11 is shown in a retracted position in which the outer surface 29 of the high-lift device 11 and the outer surface 31 of the fixed wing 7 form a continuous outer surface 25 of the wing 5. The fence 23 is, at the same time, in a first position in which it does not protrude or extend beyond the outer surface 25 of the wing 5 and is, therefore, not visible in the FIG. 3A. In this embodiment, the first position may also be referred to as a concealed position. Hence, when the high-lift device 11 is in the retracted position, for example, during cruise flight, the fence does not affect the flow about the fuselage.

In FIG. 3B, the high-lift device 11 has been moved to a first deployed position which may, for example, be assumed during take-off of an aircraft 1 when an increased lift is required and the aircraft 1 is moving at low airspeed. As can be seen, the fence 23 has been moved by an actuation mechanism 33 to a second position in which it protrudes beyond the outer surface 29 and a leading edge 35 of the high-lift device 11. In the second position, the fence 23 affects the flow around the wing 5 and, in particular, of the boundary layer. The inventors have found the fence 23 at the inward end 21 of the high-lift device 11 to be particularly efficient.

The actuation mechanism 33 is formed by a mechanical link 41 comprising a center rod 45 which extends between an inner hinge 51 attached to a rib 34 of the fixed wing 7 and an outer hinge 59 attached to the fence 23. The position of the inner hinge 51 at the rib 34 and the outer hinge 59 at the fence 23 allows a rotation of the center rod 45 about the respective hinge 51, 59 but is otherwise fixed.

FIG. 3C shows the high-lift device 11 in a second deployed position which may, for example, be assumed during landing when the aircraft 1 requires even more lift and also moves at low airspeed. The fence 23 has been moved to another second position in which it also protrudes beyond the outer surface 29 and the leading edge 35 of the high-lift device. Also, for this embodiment, the inventors found that the fence 23 at the inward end 21 of the high-lift device 11 has a particularly beneficial effect on the boundary layer flow around in the wing 5 at low airspeeds. Additionally, the movable fence 23 advantageously does not affect the flow about the wing during high airspeeds when the high-lift device 11 is in the retracted position. In the embodiment of FIGS. 3A, 3B and 3C an amount by which the fence 23 protrudes beyond the high-lift device 11 is larger when the high-lift devices is partially deployed as shown in FIG. 3B as compared to when the high-lift device 11 is fully deployed as shown in FIG. 3C.

Figure 4B:
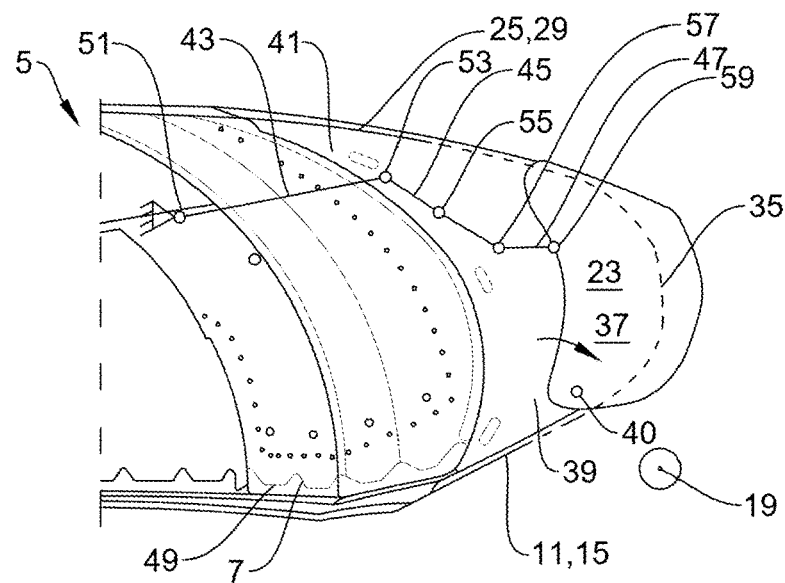
FIG. 4B shows a sectional view of the exemplary embodiment of a wing of FIG. 4A with the exemplary embodiment of the high-lift device in an extended position and the exemplary embodiment of a fence in a second position.
Figure 4C:
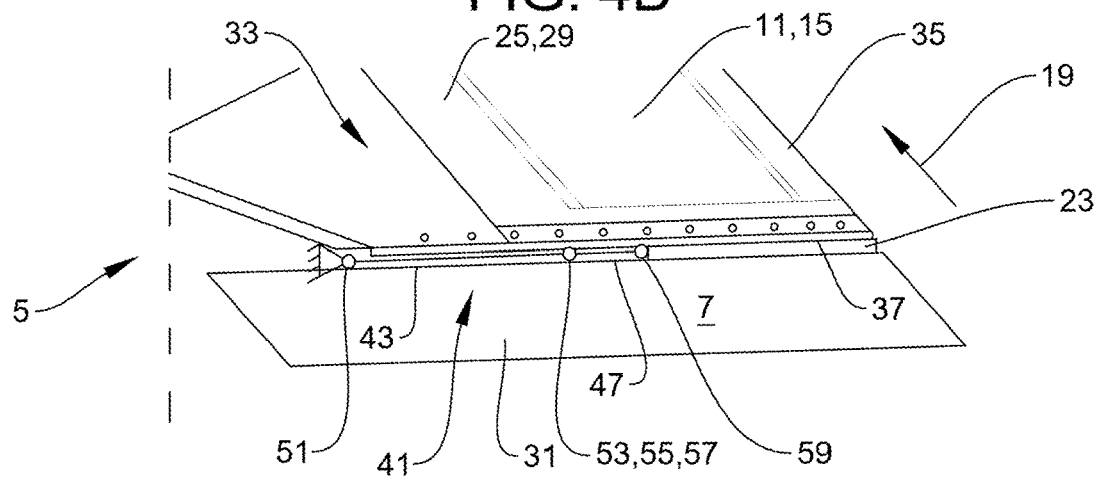
FIG. 4C shows a top view of the exemplary embodiment of a wing of FIG. 4A with the exemplary embodiment of the high-lift device in a retracted position and the exemplary embodiment of a fence in a first position.
Figure 4D:
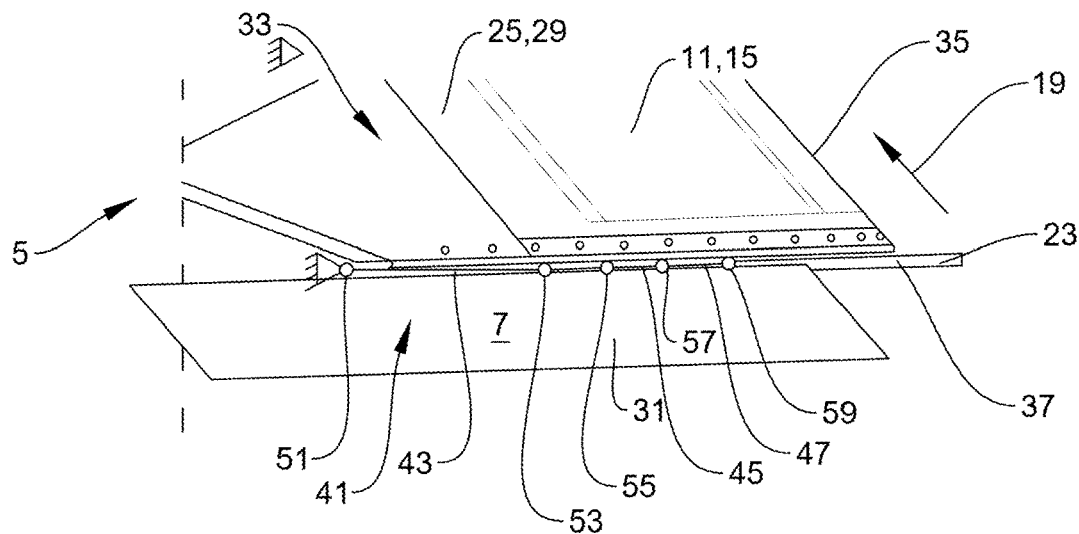
FIG. 4D shows a top view of the exemplary embodiment of a wing of FIG. 4A with the exemplary embodiment of the high-lift device in an extended position and the exemplary embodiment of a fence in a second position.

FIGS. 4A to 4D show another exemplary embodiment of a wing 5 with an exemplary embodiment of a high-lift device 11 in form of a slat 15 to which an exemplary embodiment of a fence 23 has been attached. FIGS. 4A and 4C show the high-lift device 11 in a retracted position and the fence 23 in a corresponding first position, whereas FIGS. 4B and 4D show the high-lift device 11 in an extended position and the fence 23 in a second position. As already described with regard to the previous embodiments, in the first position the fence 23 is arranged inside an outer contour of the wing 5 and does not affect the flow about the wing 5, whereas in the second position, the fence 23 protrudes beyond the outer surface 29 and, in particular, the leading edge 35 of the high-lift device.

The high-lift device 11 may be the most inward high-lift device 11 on the wing 5 but could also be one of the other high-lift devices 13. The fence 23 is attached to the inward end 21 of the high-lift device 11 but could also be the outward end 24 of the high-lift device 11.

In FIGS. 4A to 4D the fence 23 is formed by a single blade 37, also referred to as a first blade 37, which is formed by a metal sheet or a sheet made from a composite material. The first blade 37 is rotatably attached to a rib 39 of the high-lift device 11 at a first attachment or mounting point 40, as indicated by the arrow on FIG. 4B. Actuation of the fence 23 is controlled via an actuation mechanism or means 33 in a form of a mechanical link 41. The mechanical link 41 comprises an inner rod 43, a center rod 45 and an outer rod 47.

The inner rod 43 is rotatably attached to a rib 49 of the fixed wing 7 via an inner hinge 51 and also rotatably connected via a first movable bearing 53 to the center rod 45. The center rod 45 is rotatably attached to the rib 39 of the high-lift device 11 via a center hinge 55 and further rotatably connected via a second movable bearing 57 to the outer rod 47. The latter is finally connected via an outer hinge 59 to the fence 23. Note that the location where the outer hinge 59 is attached to the fence 23 is spaced apart from the location of first mounting point 40.

As can be derived from the comparison of FIGS. 4A and 4C with FIGS. 4B and 4D, when the high-lift device 11 is moved to the deployed position, the center hinge 55 moves with the high-lift device 11 away from the point where the inner hinge 51 is attached to the fixed wing 7. However, as the distance between the inner hinge 51 and the first movable bearing 53 is fixed to the length of the inner rod 43, the change of distance between the inner hinge 51 and the center hinge 55 causes the center rod 45 to rotate about the center hinge 55. In order to facilitate the rotation, the outer hinge 59 has to be pushed away from its original position. This results in a rotation of the fence 23 or, to be more precise, the first blade 37 about the first mounting point 40 and moves the fence 23 from the first position to the second position in which it protrudes beyond the outer surface 29 and the leading edge 35 of the high-lift device 11.

When the high-lift device 11 is moved back to the retracted position, the movement of the center hinge 55 with the high-lift device 11 relative to the fixed wing 7 causes the blade 37 to move back to the first position. Thus, the mechanical link 41 advantageously provides a way of coupling the movement of the fence 23 to the movement of the high-lift device such that the fence 23 is automatically extended to its second position when the high-lift device 11 is deployed and automatically retraced to its first position when the high-lift device 11 is moved to its retracted position. Thereby, it is ensured that the fence 23 only affects the flow about the wing 5 when the high-lift device 11 is deployed.

Figure 5A:
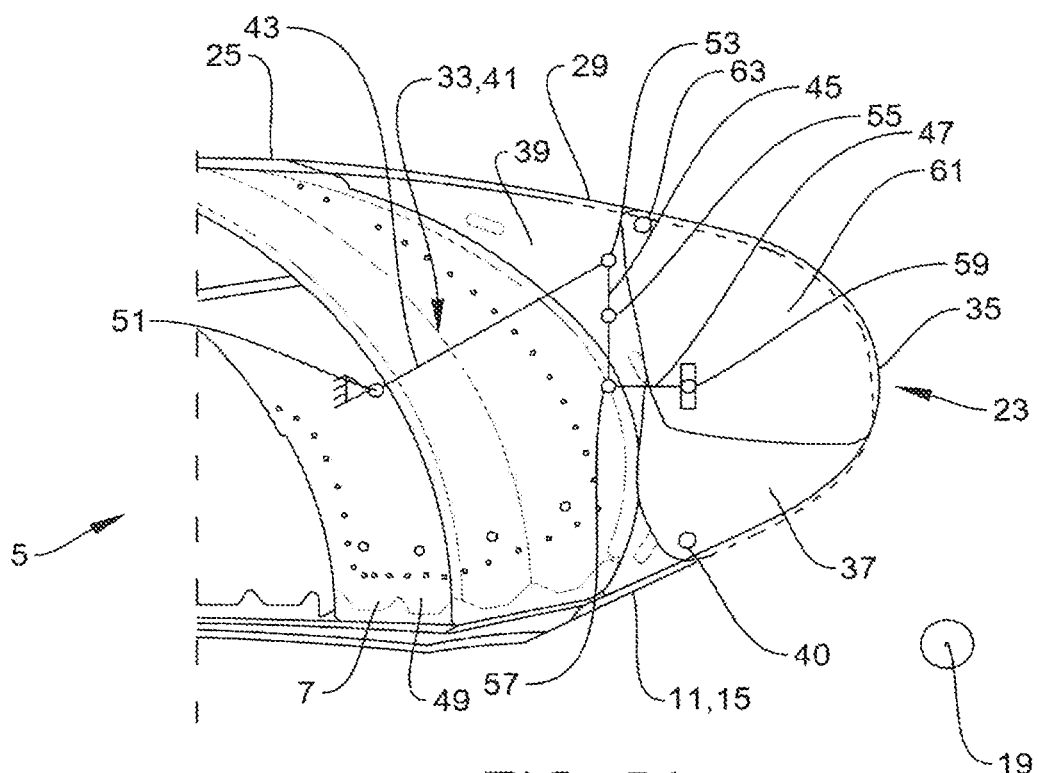
FIG. 5A shows a sectional view of a further exemplary embodiment of a wing with an exemplary embodiment of a high-lift device in a retracted position and an exemplary embodiment of a fence in a first position.
Figure 5B:
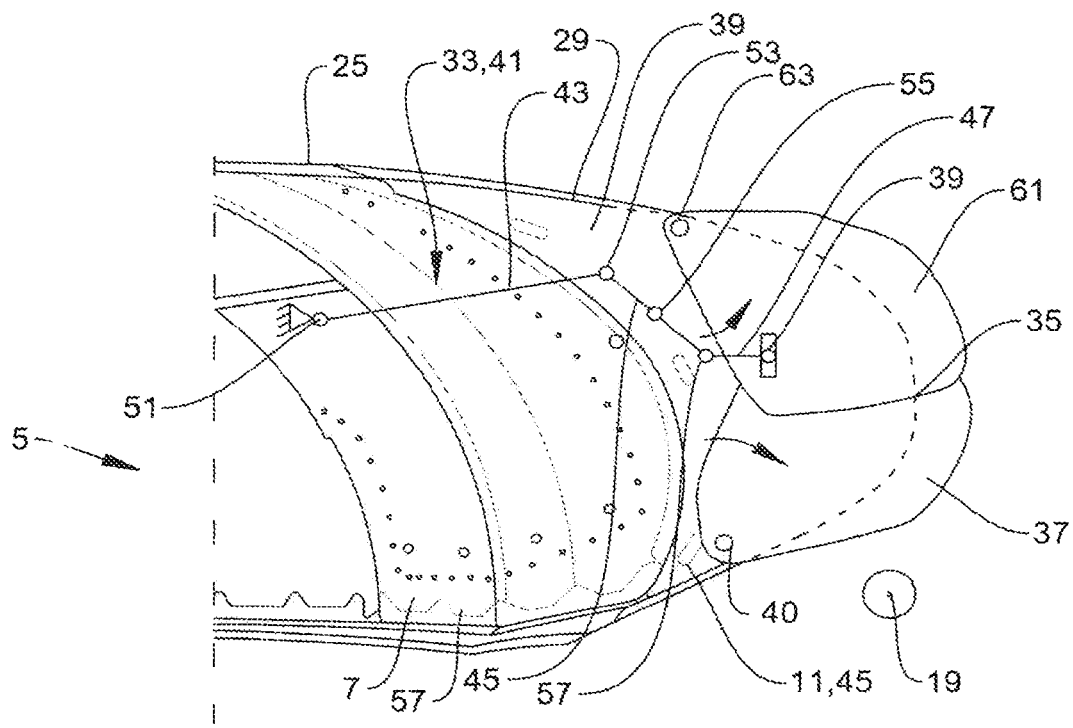
FIG. 5B shows a sectional view of the exemplary embodiment of a wing of FIG. 5A with the exemplary embodiment of the high-lift device in an extended position and the exemplary embodiment of a fence in a second position.

FIGS. 5A and 5B show an alternative embodiment of a wing 5 with an alternative embodiment of a fence 23. In contrast to the embodiment of FIGS. 4A to 4D, the fence 23 is not only formed from a first blade 37 but comprises an additional second blade 61. The second blade 61 is rotatably attached to a rib 39 of a high-lift device 11 (which is a slat 15) at a second mounting point 63, as indicated by the arrow.

The embodiments of FIGS. 5A and 5B include the actuation mechanism 33, i.e., a mechanical link 41, already discussed with regard to FIGS. 4A to 4D. The actuation mechanism 33 only differs from the embodiment in FIGS. 4A to 4D in that the outer hinge 59 is additionally connected to the second blade 61 at a position which is spaced apart from the second mounting point 63. The mechanical link 41 can thus advantageously be used to move rotate both the first blade 37 and the second blade 61 in order to move the fence 23 between the first position of FIG. 5A and the second position of FIG. 5B.

In all other aspects, the embodiments of FIGS. 5A and 5B correspond to the embodiments of FIGS. 4A to 4B and reference is made to the detailed description of the embodiments made in the preceding paragraphs.

Figure 6A:
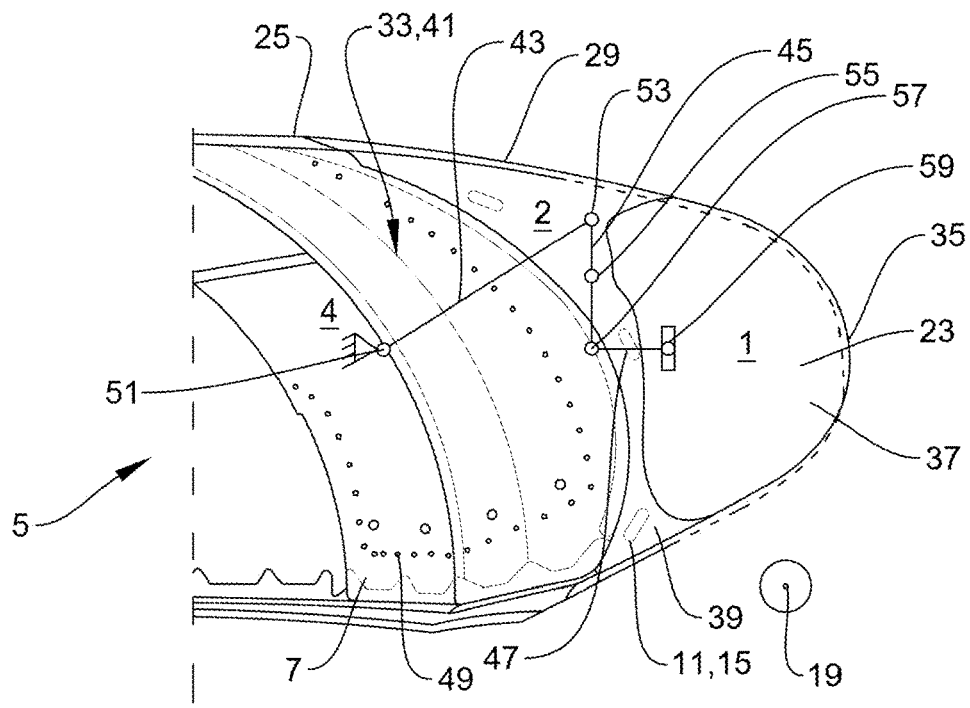
FIG. 6A shows a sectional view of a further exemplary embodiment of a wing with an exemplary embodiment of a high-lift device in a retracted position and an exemplary embodiment of a fence in a first position.
Figure 6B:
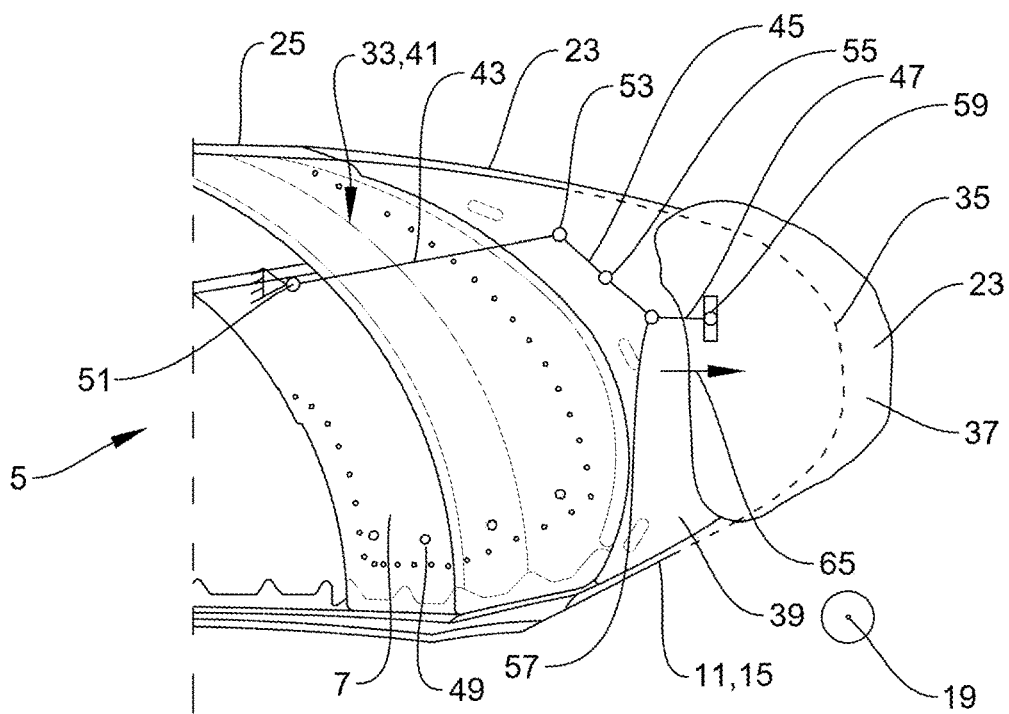
FIG. 6B shows a sectional view of the exemplary embodiment of a wing of FIG. 6B with the exemplary embodiment of the high-lift device in an extended position and the exemplary embodiment of a fence in a second position.

FIGS. 6A and 6B show an alternative embodiment of a wing 5 with an alternative embodiment of a fence 23. The embodiment only differs from the embodiment of FIGS. 4A to 4D in that a first blade 37 forming the fence 23 is not mounted at a first mounting point to the high-lift device 11 but configured for a translational movement relative to the high-lift device 11 as indicated by arrow 65 in FIG. 6B for moving the fence 23 between a first position shown in FIG. 6A and an second position shown in FIG. 6B. To this end, the blade 37 may, for example, be mounted to the high-lift device 11 using one or rails (not shown).

In all other aspects, the embodiments of FIGS. 6A and 6B correspond to the embodiments of FIGS. 4A to 4B and reference is made to the detailed description of the embodiments made in the preceding paragraphs. In particular, the same actuation mechanism can be used to move the fence 23 between the first position and the second position.

Finally, FIGS. 7A to 7D show another alternative embodiment of wing 5 comprising an alternative embodiment of a high-lift device 11 with an alternative embodiment of a fence 23. In FIGS. 7A to 7D only the high-lift device 11 and the fence 23 of the wing 5 are shown. In other words, the fixed wing is not shown in any of FIGS. 7A to 7D but may, for example, be the fixed wing of FIG. 1 or 2.

Figure 7A:
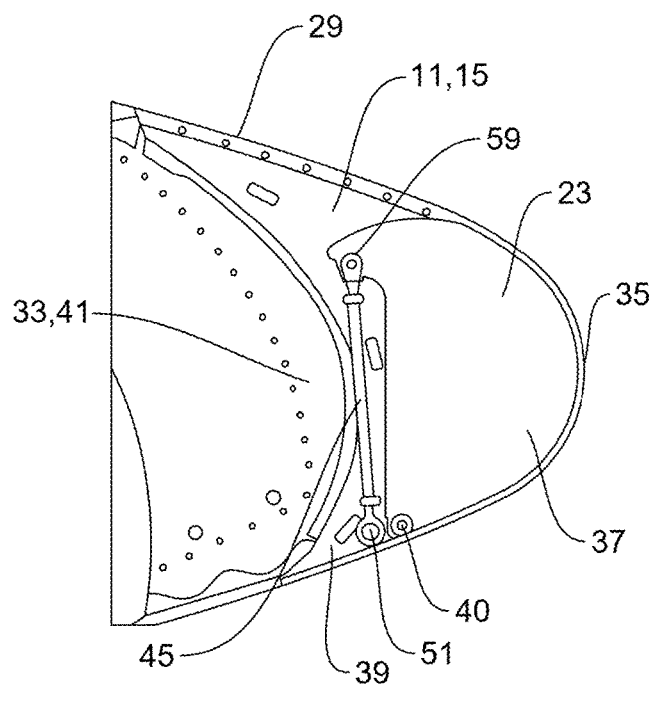
FIG. 7A shows a sectional view of a further exemplary embodiment of a wing with an exemplary embodiment of a high-lift device in a retracted position and an exemplary embodiment of a fence in a first position.

In FIG. 7A the high-lift device 11 in form of a slat 15 is shown in a retracted position in which its outer surface 29 is continuous with the outer surface of the fixed wing (not shown). The high-lift device 11 comprises a fence 23 formed by a single blade 37. The fence 23 is mounted rotatably at a first mounting point 40 to a rib 39 the high-lift device 11.

Figure 7B:
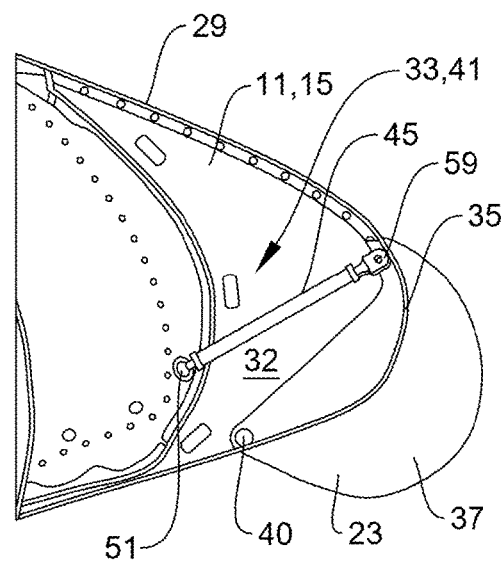
FIG. 7B shows a sectional view of the exemplary embodiment of a wing of FIG. 7A with the exemplary embodiment of the high-lift device in a first extended position and the exemplary embodiment of a fence in a second position.
Figure 7C:
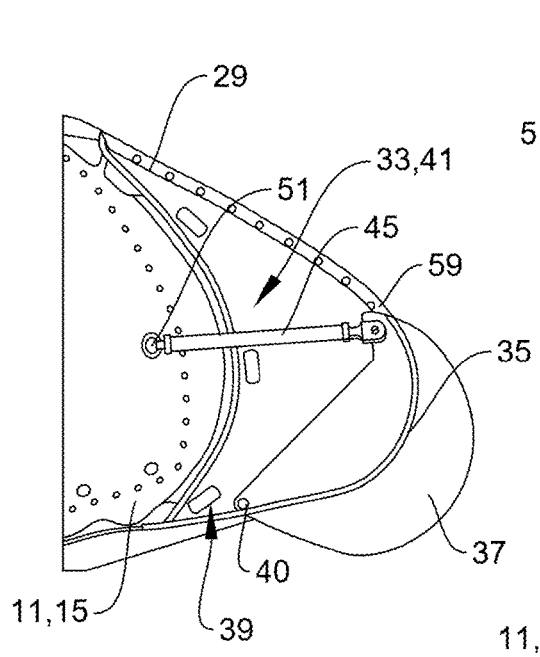
FIG. 7C shows a sectional view of the exemplary embodiment of a wing of FIG. 7A with the exemplary embodiment of the high-lift device in a third extended position and the exemplary embodiment of a fence in a further second position and FIG. 7D shows a sectional view of the exemplary embodiment of a wing of FIG. 7A with the exemplary embodiment of the high-lift device in a third extended position and the exemplary embodiment of a fence in a further second position.
Figure 7D:
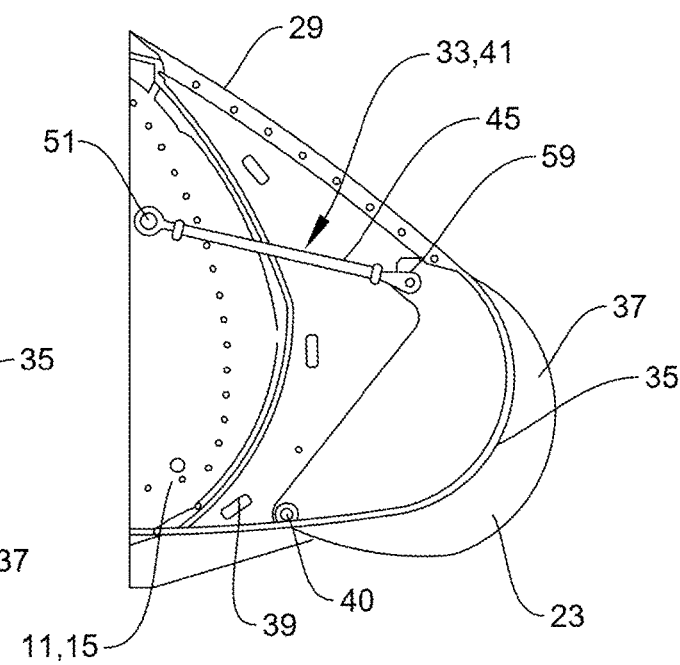

In order to move the fence 23 from the first position shown in FIG. 7A and second positions shown in FIGS. 7B to 7D, an actuating mechanism 33 in the form of a mechanical link 41 is provided. The mechanical link 41 is simplified as compared to the mechanical link 41 shown in FIGS. 4A to 4D, 5A, 5B, 6A and 6B in that it only comprises a center rod 45 directly connecting an inner hinge 51 located at the fixed wing (not shown) to an outer hinge 59 attached to the first blade 37. The outer hinge 59 is spaced apart from the first mounting point 40. The mechanical link 41 advantageously moves the fence 23 automatically between the first position and the second position when the high-lift device 11 is moved between the retracted position and the extended position so that the fence 23 only affects the flow about the wing 5 when the high-lift device 11 is deployed. The center rod 45 shown in this embodiment may be straight or curved.

FIGS. 7B to 7D show the high-lift device 11 of FIG. 7A in various deflected or deployed positions. For example, in FIG. 7B the high-lift device 11 has been deflected by 6 degrees, in FIG. 7C by 14 degrees and in FIG. 7D by 21 degrees. When the high-lift device 11 is moved from the retracted position in FIG. 7A to one of the extended positions shown in FIGS. 7B to 7D, the distance and relative position of the first mounting point 40 to the inner hinge 51 changes (note that the position of the inner hinge 51 is fixed as it is mounted to the fixed wing). As the distance between the inner hinge 51 and the outer hinge 59 is kept constant due to the fixed length of the center rod 45, the fence 23 is rotated relative to the high-lift device 11 about the first mounting point 40.

In the exemplary embodiment shown in FIGS. 7A to 7D, the location of the inner and outer hinges 51, 59, and the dimensions of the center rod, have been chosen such that the amount or degree by which the fence 23 is extended or protrudes beyond an outer surface 29 and the leading edge 35 of the high-lift device 11 reaches is maximum when the high-lift device 11 is deflected by 6 degrees as shown in FIG. 7A. When the high-lift device 11 is deflected further the amount by which the fence 23 protrudes beyond the outer surface 29 of the high-lift device 11 decreases.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft comprising a fixed wing and a high-lift device attached to a leading edge of the fixed wing,
   wherein the high-lift device extends in a spanwise direction of the wing between an inward end of the high-lift device and an outward end of the high-lift device and wherein the high-lift device is configured to be moved between a retracted position and an extended position,
   wherein the high-lift device comprises a movable fence arranged at the inward end or the outward end of the high-lift device,
   wherein the fence is configured such that the fence is movable between a first position and a second position, wherein in the first position the fence does not protrude beyond an outer surface of the high-lift device and in the second position the fence protrudes beyond the outer surface of the high-lift device or wherein in the first position the fence protrudes less beyond the outer surface of the high-lift device than in the second position, and
   wherein the fence is further configured such that the fence is in the first position when the high-lift device is in the retracted position and that the fence is in the second position when the high-lift device is in the extended position.

2. The wing according to claim 1, wherein the fence comprises an actuating mechanism for moving the fence from the first position to the second position when the high-lift device is moved from the retracted position to the extended position and for moving the fence from the second position to the first position when the high-lift device is moved from the extended position to the retracted position.

3. The wing according to claim 2, wherein the actuating mechanism is a mechanical link connecting the fence to the fixed wing.

4. The wing according to claim 3, wherein the mechanical link extends from an inner hinge attached to the fixed wing to an outer hinge attached to the fence and comprises at least a center rod.

5. The wing according to claim 4, wherein the mechanical link extends via a first movable bearing, a center hinge located at the high-lift device and a second movable bearing and additionally comprises an inner rod and an outer rod, wherein the inner rod extends between the inner hinge and the first movable bearing, the center rod extends between the first movable bearing and the second movable bearing and is rotatably attached at the center hinge to the high-lift device and the outer rod extends between the second movable bearing and the outer hinge.

6. The wing according to claim 4, wherein the center rod directly connects the inner hinge to the outer hinge.

7. The wing according to claim 1, wherein the fence protrudes beyond a leading edge of the high-lift device in the second position.

8. The wing according to claim 1, wherein the fence comprises a first blade.

9. The wing according to claim 8, wherein the first blade is rotatably mounted to the high-lift device at a first mounting point, wherein the first blade is configured to rotate about the first mounting point for moving the fence between the first position and the second position.

10. The wing according to claim 1,
wherein the fence comprises an actuating mechanism for moving the fence from the first position to the second position when the high-lift device is moved from the retracted position to the extended position and for moving the fence from the second position to the first position when the high-lift device is moved from the extended position to the retracted position,
wherein the actuating mechanism is a mechanical link connecting the fence to the fixed wing,
wherein the mechanical link extends from an inner hinge attached to the fixed wing to an outer hinge attached to the fence and comprises at least a center rod,
wherein the fence comprises a first blade, and
wherein the outer hinge is attached to the first blade at a position which is spaced apart from the first mounting point such that a movement of the high-lift device between the retracted position and the extended position results in a rotation of the center rod about the center hinge which is translated via the outer rod into a rotation of the first blade.

11. The wing according to claim 8, wherein the first blade is configured to perform a translational motion for moving the fence between the first position and the second position.

12. The wing according to claim 8, wherein the fence additionally comprises a second blade.

13. The wing according to claim 12, wherein the second blade is rotatably mounted to the high-lift device at a second mounting point, wherein the first blade is configured to rotate about the second mounting point for moving the fence between the first position and the second position.

14. The wing according to claim 1,
wherein the fence comprises an actuating mechanism for moving the fence from the first position to the second position when the high-lift device is moved from the retracted position to the extended position and for moving the fence from the second position to the first position when the high-lift device is moved from the extended position to the retracted position,
wherein the actuating mechanism is a mechanical link connecting the fence to the fixed wing,
wherein the mechanical link extends from an inner hinge attached to the fixed wing to an outer hinge attached to the fence and comprises at least a center rod,
wherein the mechanical link extends via a first movable bearing, a center hinge located at the high-lift device and a second movable bearing and additionally comprises an inner rod and an outer rod, wherein the inner rod extends between the inner hinge and the first movable bearing, the center rod extends between the first movable bearing and the second movable bearing and is rotatably attached at the center hinge to the high-lift device and the outer rod extends between the second movable bearing and the outer hinge,
wherein the fence comprises a first blade,
wherein the fence additionally comprises a second blade, and
wherein the outer hinge is attached to the second blade at a position which is spaced apart from the second mounting point such that a movement of the high-lift device between the retracted position and the extended position results in a rotation of the center rod about the center hinge which is translated via the outer rod into a rotation of the second blade.

15. The wing according to claim 1, wherein the high-lift device is a slat or a droop nose.

16. The wing according to claim 1, wherein the wing comprises a plurality of additional high-lift devices each attached to the leading edge of the fixed wing and wherein the high-lift device comprising the fence is arranged inward of the plurality of the additional high-lift devices on the fixed wing in the spanwise direction and wherein the fence is attached at the inward end of the high-lift device.

17. An aircraft comprising a wing according to claim 1.

18. A high-lift device for a wing for an aircraft, the wing comprising a fixed wing,
wherein the high-lift device is configured for attachment to a leading edge of the fixed wing such that the high-lift device extends in a spanwise direction of the wing between an inward end of the high-lift device and an outward end of the high-lift device and can be moved between a retracted position and an extended position,
wherein the high-lift device comprises a movable fence arranged at the inward end or the outward end of the high-lift device,
wherein the fence is configured such that the fence is movable between a first position and a second position, wherein in the first position the fence does not protrude beyond an outer surface of the high-lift device and in the second position the fence protrudes beyond the outer surface of the high-lift device or wherein in the first position the fence protrudes less beyond the outer surface of the high-lift device than in the second position, and
wherein the fence is further configured such that the fence is in the first position when the high-lift device is in the retracted position and that the fence is in the second position when the high-lift device is in the extended position.

19. A fence for a high-lift device,
wherein the high-lift device is part of a wing for an aircraft, the wing further comprising a fixed wing, wherein the high-lift device is attached to a leading edge of the fixed wing such that it extends in a spanwise direction of the wing between an inward end of the high-lift device and an outward end of the high-lift device and can be moved between a retracted position and an extended position,
wherein the fence is configured to be movably attached to the high-lift device at the inward end or the outward end of the high-lift device,
wherein the fence is configured such that the fence is movable between a first position and a second position, wherein in the first position the fence does not protrude beyond an outer surface of the high-lift device and in the second position the fence protrudes beyond the outer surface of the high-lift device or wherein in the first position the fence protrudes less beyond the outer surface of the high-lift device than in the second position, and
wherein the fence is further configured such that the fence is in the first position when the high-lift device is in the retracted position and that the fence is in the second position when the high-lift device is in the extended position.

* * * * *